US011283713B2

(12) United States Patent
Kaku et al.

(10) Patent No.: US 11,283,713 B2
(45) Date of Patent: Mar. 22, 2022

(54) RELAY DEVICE

(71) Applicant: DENSO CORPORATION, Kariya (JP)

(72) Inventors: Yoshifumi Kaku, Kariya (JP); Taichi Itagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 119 days.

(21) Appl. No.: 16/809,642

(22) Filed: Mar. 5, 2020

(65) Prior Publication Data

US 2020/0314007 A1 Oct. 1, 2020

(30) Foreign Application Priority Data

Mar. 29, 2019 (JP) .............................. JP2019-068008

(51) Int. Cl.
| | |
|---|---|
| *H04L 12/40* | (2006.01) |
| *H04L 45/00* | (2022.01) |
| *G06F 16/28* | (2019.01) |
| *H04L 69/16* | (2022.01) |
| *H04L 45/74* | (2022.01) |
| *H04L 43/028* | (2022.01) |

(52) U.S. Cl.
CPC ............ *H04L 45/70* (2013.01); *G06F 16/285* (2019.01); *H04L 43/028* (2013.01); *H04L 45/74* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 2007/0140273 | A1* | 6/2007 | Kubota | ............... H04L 63/0209 |
| | | | | 370/401 |
| 2009/0304008 | A1 | 12/2009 | Kono et al. | |
| 2016/0373352 | A1* | 12/2016 | Sharma | .................... H04L 45/64 |
| 2018/0041470 | A1* | 2/2018 | Schultz | .................... H04L 47/24 |
| 2020/0092178 | A1* | 3/2020 | Nelson | ................... H04L 41/145 |
| 2020/0358704 | A1* | 11/2020 | Anafi | .................... H04L 1/0003 |

\* cited by examiner

*Primary Examiner* — Ajit Patel
(74) *Attorney, Agent, or Firm* — Posz Law Group, PLC (57) ABSTRACT

A relay device for relaying a frame between communication lines includes: a classification acquisition unit for acquiring at least one classification item group having classification items and representing a classification condition for classifying a received frame to perform a predetermined process; a condition generation unit for generating at least one condition item group having condition items and representing a filtering rule for the frame based on the classification item group; and an execution unit for performing the process on the received frame based on the filtering rule. The classification acquisition unit acquires the classification item group in which a numerical number of the classification items is less than a numerical number of the condition items.

8 Claims, 6 Drawing Sheets

| # | valid | PHYSICAL PORT | TP PROTOCOL | S-Port | D-Port | |
|---|---------|------|------|-----|------|---|
| 1 | enable  | P1   | UDP  | –   | 1234 | 81 |
| 2 | disable | xxx  | xxx  | xxx | xxx  | |

41

CLASS ITEM / SELECTION ITEM

FIG. 3

| No. | Act | PHYSICAL PORT | D-MAC | S-MAC | VID | Type | D-IP | S-IP | TP PROTOCOL | S-Port | D-Port | |
|---|---|---|---|---|---|---|---|---|---|---|---|---|
| 1 | DISCARD | P1 | — | — | — | — | — | — | UDP | — | — | |
| 2 | TRANSFER | P1 | — | — | — | — | — | — | UDP | — | 1234 | 91 |
| 3 | DISCARD | P2 | — | — | — | IPv4 | — | — | — | — | — | |
| 4 | TRANSFER | P2 | — | MAC-B | — | IPv4 | — | IP-B | — | — | — | |
| 5 | | | | | | | | | | | | |

—: don't care

| No. | Act | PHYSICAL PORT | D-MAC | S-MAC | VID | Type | D-IP | S-IP | TP PROTOCOL | S-Port | D-Port |
|---|---|---|---|---|---|---|---|---|---|---|---|
| 1 | — | — | — | — | — | — | — | — | — | — | — |
| 2 | — | — | — | — | — | — | — | — | — | — | — |
| 3 | — | — | — | — | — | — | — | — | — | — | — |
| 4 | — | — | — | — | — | — | — | — | — | — | — |
| 5 | — | — | — | — | — | — | — | — | — | — | — |

52

—: don't care

FIG. 6

CLASS ITEM / SELECTION ITEM

42

| # | valid | PHYSICAL PORT | Type | S-MAC | S-IP |
|---|---|---|---|---|---|
| 3 | enable | P2 | IPv4 | MAC-B | IP-B |
| 4 | disable | xxx | xxx | xxx | xxx |

CLASS ITEM / SELECTION ITEM

43

| # | valid | PHYSICAL PORT | Type | MAC Addres | IP Addres |
|---|---|---|---|---|---|
| 1 | enable | P1 | IPv4 | MAC-A | IP-A |
| 2 | disable | xxx | xxx | xxx | xxx |

| No. | Act | PHYSICAL PORT | TRANS/RECEP | D-MAC | S-MAC | VID | Type | D-IP | S-IP | TP PROTOCOL | S-Port | D-Port |
|---|---|---|---|---|---|---|---|---|---|---|---|---|
| 1 | DISCARD | P1 | RANS AND RECEP | — | — | — | IPv4 | — | — | — | — | — |
| 2 | TRANSFER | P1 | RECEP | — | MAC-A | — | IPv4 | — | MAC-A | — | — | — |
| 3 | TRANSFER | P1 | RECEP | MAC-A | — | — | IPv4 | MAC-A | — | — | — | — |
| 4 | — | — | — | — | — | — | — | — | — | — | — | — |
| 5 | | | | | | | | | | | | |

—: don't care

RELAY DEVICE

CROSS REFERENCE TO RELATED APPLICATION

The present application claims the benefit of priority from Japanese Patent Application No. 2019-68008 filed on Mar. 29, 2019. The entire disclosure of the above application is incorporated herein by reference.

TECHNICAL FIELD

The present disclosure relates to a relay device configured to relay a frame between multiple communication lines.

BACKGROUND

A conceivable technique provides relaying a frame between multiple communication lines.

An Ethernet (registered trademark) switch has been known as a relay device configured to relay a frame between multiple communication devices. The relay device such as the Ethernet switch may be provided with a function of filtering the frame to be relayed. The filtering is performed according to a filtering rule. The filtering rule is represented by, for example, a filtering rule table. For example, the filtering rule may be set by writing the filtering rule table to the relay device by a device outside the relay device (hereinafter referred to as external device).

SUMMARY

According to an example embodiment, a relay device for relaying a frame between communication lines includes: a classification acquisition unit for acquiring at least one classification item group having classification items and representing a classification condition for classifying a received frame to perform a predetermined process; a condition generation unit for generating at least one condition item group having condition items and representing a filtering rule for the frame based on the classification item group; and an execution unit for performing the process on the received frame based on the filtering rule. The classification acquisition unit acquires the classification item group in which a numerical number of the classification items is less than a numerical number of the condition items.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

As a result of detailed examination by the present inventors, since there is a need to write a large number of filtering rules in order to realize various types of filtering, a problem has been found that a set time of the filtering rules for the relay device by the external device becomes long.

A technique in which a set time for setting a filtering rule is shortened is provided.

According to an example embodiment, a relay device configured to relay a frame between a plurality of communication lines, includes: a classification acquisition unit configured to acquire at least one classification item group which has a plurality of classification items and represents a classification condition for classifying a received frame to perform a predetermined process; a condition generation unit configured to generate at least one condition item group which has a plurality of condition items and represents a filtering rule for the frame based on the classification item group; and an execution unit configured to perform the process on the received frame based on the filtering rule represented by the condition item group. The classification acquisition unit is configured to acquire the classification item group in which a numerical number of the classification items is less than a numerical number of the condition items in the condition item group.

For example, if the classification item group is acquired from the external device, the communication capacity with the external device is inhibited as compared with the case where the condition item group representing the filtering rule is acquired. As a result, the set time of the filtering rule can be shortened.

Embodiments of the present disclosure will be described below with reference to the drawings.

1. First Embodiment

1-1. Configuration

Figure 1:
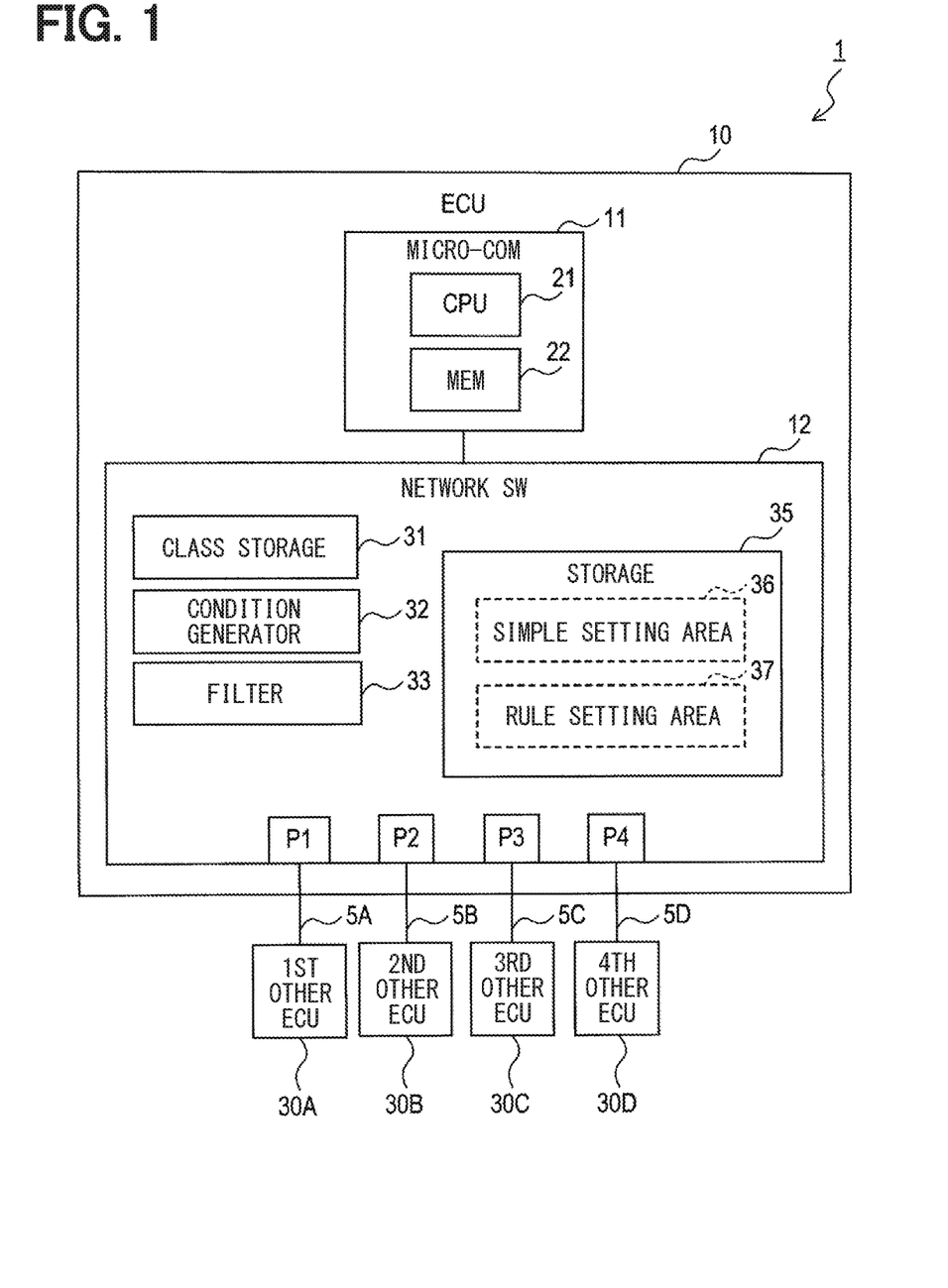
FIG. 1 is a block diagram showing a configuration of a communication system, an ECU, and a network switch.

A communication system 1 shown in FIG. 1 is a system that is mounted on a vehicle such as a passenger car, for example, for relaying a frame between communication devices in the vehicle. The frame is communication data to be relayed. The communication system 1 includes an electronic control unit (hereinafter referred to as ECU) 10 which is a communication device. In addition, the communication system 1 may include multiple other ECUs 30 which are communication devices.

In the present embodiment, the communication system 1 includes a first other ECU 30A, a second other ECU 30B, a third other ECU 30C, and a fourth other ECU 30D. The ECU is an abbreviation for "Electronic Control Unit".

The ECU 10 includes a microcomputer 11 and a network switch 12.

The microcomputer 11 includes a CPU 21 and a semiconductor memory 22 such as a random access memory (RAM) or a read only memory (ROM). The functions of the microcomputer 11 are realized by causing the CPU 21 to execute a program stored in a non-transitory tangible storage medium. In this example, the memory 22 corresponds to a non-transitory tangible storage medium in which a program is stored. When the execution of the program, a method corresponding to the program is executed.

Part or all of the functions performed by the microcomputer 11 may be realized using one or multiple hardware. For example, when the above functions are realized by an electronic circuit which is hardware, the electronic circuit may be realized by a digital circuit, an analog circuit, or a combination of the digital circuit and the analog circuit.

In the present embodiment, the microcomputer 11 is configured to realize a function of controlling the operation of the ECU 10. The microcomputer 11 is configured to realize a function related to the setting of the network switch 12. In order to set the network switch 12, the microcomputer 11 transmits a simple rule table (hereinafter referred to as simple table) 41 to be described later to the network switch 12 at a predetermined cycle or at an arbitrary timing. A simple table 41 is stored in, for example, the memory 22.

The network switch 12 is a relay device that relays a communication between the other ECUs 30 mounted on a vehicle. The network switch 12 relays communication data based on standards of protocols such as Ethernet and Internet protocol, for example. In the present embodiment, the network switch 12 is configured as a layer 2 switch.

The network switch 12 includes multiple ports P1 to P4 for transmitting and receiving frames. In other words, the ports P1, P2, P3, and P4 function as transceivers for transmitting and receiving the frames. The number of ports may be any number of two or more, such as two or three.

Four communication lines 5A, 5B, 5C, and 5D are connected to the ports P1, P2, P3, and P4, respectively. The first other ECU 30A is connected to the port P1 through the communication line 5A, and the second other ECU 30B is connected to the port P2 through the communication line 5B. The third other ECU 30C is connected to the port P3 through the communication line 5C, and the fourth other ECU 30D is connected to the port P4 through the communication line 5D. The first other ECU 30A, the second other ECU 30B, the third other ECU 30C, and the fourth other ECU 30D communicate with each other through the communication line 5A, 5B, 5C, and 5D and the network switch 12.

The network switch 12 is configured to filter and relay the frames between the multiple communication lines 5A, 5B, 5C, and 5D.

The network switch 12 is configured as hardware including a circuit such as a semiconductor device, for example. The network switch 12 further includes a classification storage unit 31, a condition generation unit 32, a filter unit 33, and a storage unit 35.

When the simple table 41 is transmitted from the microcomputer 11 to the network switch 12, the classification storage unit 31 is configured to receive the simple table 41 and store the simple table 41 in the storage unit 35.

When the simple table 41 is stored in the storage unit 35, the condition generation unit 32 is configured to execute a condition generating process to be described later, and generate a filtering rule table (hereinafter referred to as rule table) based on the simple table 41. The condition generation unit 32 is configured to store the generated rule table in the storage unit 35. The condition generation unit 32 is configured to generate at least two filtering rules based on one simple rule 41. In other words, at least two filtering rules are described in the rule table.

The filtering rule is a rule for determining a process of relaying or discarding a received frame in accordance with characteristics of the frame such as an address included in the frame, a format of the frame, a data length of the frame, a type of the frame, and the like.

The filter unit 33 is configured to manage the overall relaying of the frames. In the present embodiment, the filter unit 33 selects whether to relay or discard the received frame in accordance with the filtering rule generated by the condition generation unit 32, and performs the selected processing. However, the present disclosure is not limited to the above processing. The filter unit 33 may be configured to perform various processing on the frame according to the filtering rule.

The storage unit 35 is at least one memory capable of holding data even while the operation of the ECU 10 is stopped, and capable of writing and reading data. The storage unit 35 may be, for example, a standby RAM to which a data retention power is constantly supplied, or may be a rewritable non-volatile memory such as an EEPROM or a flash memory.

The storage unit 35 includes a simple setting area 36 and a rule setting area 37 as storage areas for holding data. The simple table 41 is stored in the simple setting area 36, and a rule table is stored in the rule setting area 37.

Simple Table

Figure 2:
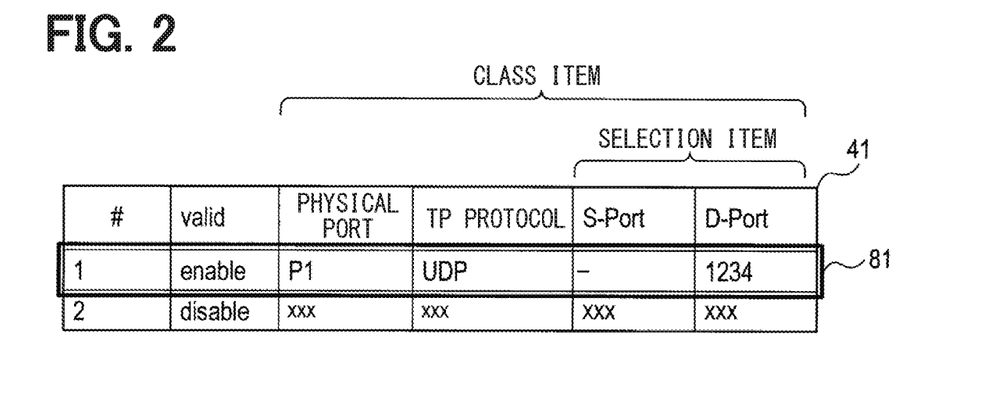
FIG. 2 is an illustrative diagram showing an example of a simple table according to a first embodiment.

FIG. 2 shows an example of the simple table 41. In the simple table 41, at least one classification item group 81 can be described by setting a description item for one line as one classification item group 81. In the present embodiment, the multiple classification item groups 81 are described in the simple table 41. In other words, the classification item groups 81 for multiple lines are described.

The classification item group 81 has multiple classification items, and is an item group representing a classification condition. The classification condition is a condition for classifying the received frame so that predetermined processing is performed. The classification condition is represented by the multiple classification items. The predetermined process referred to in the present embodiment is at least one of a discard process and a transfer process. In other words, transferring the frame designated according to the classification condition corresponds to predetermined processing in the classification item group. In other words, discarding a frame other than the frame designated by the classification condition corresponds to predetermined processing in the classification item group described above.

As described above, in the simple table 41, each of the classification item groups 81 describes each of the simple rules. The simple rule is a rule for classifying a received frame such that a predetermined process, which is either the discard process or the transfer process is performed.

It should be noted that the present disclosure is not limited to the above processing, and the predetermined processing referred to in the present specification may include various types of processing other than the discard process and the transfer process.

In the example of FIG. 2, each of the classification item groups 81 includes multiple classification items including a physical port, a TP protocol, a port number (hereinafter referred to as S-port) indicating a source of a frame, and a port number (hereinafter referred to as D-Port) indicating a destination of the frame.

In the example of FIG. 2, each classification item group 81 further includes a classification number and validity/invalidity information. In FIG. 2, the classification numbers described as "#1" and "#2" are numbers for identifying the classification item group 81, and a unique number is allocated to each classification item group 81.

In FIG. 2, the validity/invalidity information described in the "valid" column is information for setting whether the generation of the condition item group based on the classification item group 81 is valid or invalid in the condition generating process to be described later. When the validity/invalidity information is "enable", that is, valid, the condition item group is generated based on the classification item group 81, and when the validity/invalidity information is "disable", that is, invalid, the condition item group is not generated based on the classification item group 81.

The physical port indicates a port to which the setting by the classification item group 81 is applied among the ports P1 to P4. The TP protocol is information indicating the protocol of a transport layer. In the present embodiment, UDP or TCP is applied.

Further, at least one selection item is included as a classification item in the classification item group 81. The selection item is a classification item representing at least one of a source of the frame and a destination of the frame. Specifically, in the example of FIG. 2, the D-Port in the UDP and the S-Port in the UDP are included as selection items. In the example of FIG. 2, among the D-Port in the UDP and the S-Poet in the UDP, the port number is specifically designated as "1234" only in the D-Port.

However, the present disclosure is not limited to the above example, and among the D-Port in the UDP and the S-Port in the UDP, the port number may be specifically designated as, for example, "2345" only in the S-Port. In addition, at least one of the D-Port in the UDP and the S-Port in the UDP may be included as a selection item in the classification item group 81. When the TP protocol is TCP, at least one of the D-Port in the TCP and the S-Port in the TCP may be included as the selection item in the classification item group 81.

For example, in the example shown in FIG. 2, a classification condition for designating a frame whose D-Port is "1234" among the UDP frames received by the port P1 is represented in the classification item group of the classification number #1. In addition, transferring only the frame identified according to the classification condition corresponds to predetermined processing in the classification item group described above. In other words, discarding all frames other than the frame identified by the classification condition corresponds to predetermined processing in the classification item group described above.

In the present embodiment, the multiple classification items in the classification item group 81 are a part of the condition items in the condition item group describing a filtering rule to be described later. In other words, the number of classification items in the classification item group 81 is smaller than the number of condition items in the condition item group describing the filtering rule to be described later.

Rule Table

Figure 3:
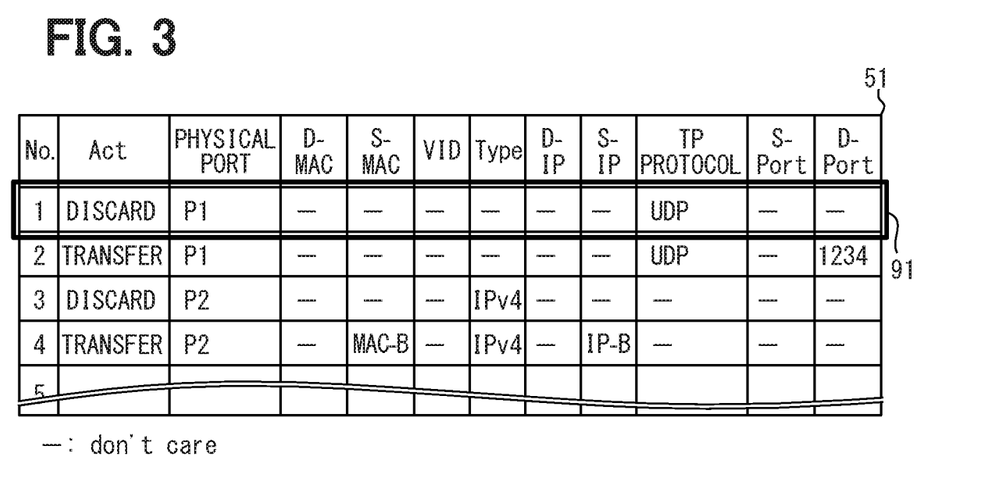
FIG. 3 is an illustrative diagram showing an example of a rule table according to the first embodiment.

FIG. 3 shows an example of the rule table 51. In the rule table 51, at least one condition item group 91 can be described with the description items for one line as one condition item group 91. In the present embodiment, the multiple condition item groups 91 are described in the rule table 51. In other words, the condition item groups 91 for the multiple lines are described.

The condition item group 91 has the multiple condition items, and represents a filtering rule for the frame. The filtering rule is a rule representing a predetermined process for the received frame. In the present embodiment, the filtering rule represents a rule, that is, a condition, for determining processing for the received frame, such as whether to transfer or discard. However, the present disclosure is not limited to the above processing, and the predetermined processing referred to in the present specification may include various types of processing other than discarding and transferring.

In the example of FIG. 3, each condition item group 91 includes the multiple condition items including a rule number, a process content, a physical port, a destination MAC address (hereinafter referred to as D-MAC), a source MAC address (hereinafter referred to as S-MAC), a VLAN_ID (hereinafter referred to as VID), and a type (hereinafter referred to as Type). Further, a destination IP address (hereinafter referred to as D-IP), a source IP address (hereinafter referred to as S-IP), a TP protocol, an S-Port, and a D-Port are included as the multiple condition items.

In FIG. 3, the rule numbers described as "No. 1" and "No. 2" are numbers for identifying the condition item group 91, that is, the filtering rule, and are assigned unique numbers for each filtering rule. The processing contents described in the "Act" column in FIG. 3 indicate what processing is performed on the received frame. In the present embodiment, one of transfer and discard is described as the processing content for each condition item group 91. In FIG. 3, the content indicated by the symbol "-" indicates that the content may be arbitrary.

In the example of FIG. 3, the condition item group 91 of the rule number No. 1, that is, the filtering rule describes that all UDP frames received by the port P1 are discarded as predetermined processing in the condition item group 91 described above. Further, the filtering rule of the rule number No. 2 describes that only a frame having a D-Port of "1234" among the UDP frames received by the port P1 is transferred as a predetermined process in the condition item group 91 described above.

The condition item group 91 of the rule number No. 3 describes that all the IPv4 frames received by the port P2 are discarded as a predetermined process in the condition item group 91 described above. Further, the filtering rule of the rule number No. 4 describes that only a frame whose S-MAC and S-IP represent the second other ECU 30B among the IPv4 frames received by the port P2 is transferred as a predetermined process in the condition item group 91 described above. The MAC-B is the MAC address of the second other ECU 30B, and the IP-B is the IP address of the second other ECU 30B.

In addition, a large number of filtering rules are set in the rule table 51, but a description of the filtering rules will be omitted in the present specification. In addition, although an example in which the filtering rule is applied to the frame received by the physical port has been described, the present disclosure is not limited to the above example. For example, the filtering rule may be applied to the frame transmitted from the physical port. Also, for example, the filtering rule may be applied to both the frame received by the physical port and the frame transmitted from the physical port.

In the rule table 51, the condition item group 91 is set to have a higher priority as the rule number increases. For example, the filter unit 33 described above may be configured to overwrite the processing content of the frame identified by the filtering rule as the rule number increases, and perform processing in accordance with the processing content that has been overwritten. As a result, for example, in the filtering rules of the rule number No. 1 and the rule number No. 2, among the UDP frames received at the port P1, only the frame having the destination port number of "1234" is transferred without being discarded.

In the present embodiment, the multiple condition items in the condition item group 91 include all the classification items in the classification item group 81 describing the simple rule. In other words, the number of condition items in the condition item group 91 is larger than the number of classification items in the classification item group 81.

1-2. Processing

The condition generating process to be executed by the condition generation unit 32 will be described with reference to a flowchart of FIG. 4. The condition generation unit 32 is activated when the simple table 41 is stored in the storage unit 35. When the condition generating process is started, the rule table 51 stored in the rule setting area 37 of the storage unit 35 may be initialized as in the rule table 52 shown in FIG. 5. The initialization means, for example, a state indicating that all the descriptions of the condition items may be arbitrary.

In S100, the condition generation unit 32 acquires the simple table 41 from the simple setting area 36 of the storage unit 35. When the multiple classification item groups 81 are included in the simple table 41, the condition generation unit 32 repeatedly executes the processes of S110 to S160 for each classification item group 81 in ascending order of the classification number.

In S110, the condition generation unit 32 determines whether or not the classification item group 81 is valid. When "valid" is identified as "enable", the condition generation unit 32 determines that the classification item group 81 is valid. In other words, when "valid" is identified as "disable", the condition generation unit 32 determines that the classification item group 81 is invalid. The condition generation unit 32 shifts the process to S120 when the classification item group 81 is valid, and ends the present condition generating process when the classification item group 81 is invalid.

In S120, the condition generation unit 32 determines whether or not the TP protocol is identified as the UDP in the classification item group 81. In this example, the condition generation unit 32 shifts the process to S130 when the TP protocol is identified as the UDP. On the other hand, when the TP protocol is not identified as the UDP, in other words, when the TP protocol is identified as the TCP, the condition generation unit 32 shifts the process to S150.

In S130, based on the description of the classification item group 81, the condition generation unit 32 generates the condition item group 91 indicating the filtering rule for discarding the designated frame for the physical port designated by the classification item group 81. The designated frame is a classification item in the classification item group, and is a frame represented by at least a classification item other than the selection item.

For example, in the case of the classification item group 81 of the classification number #1 shown in FIG. 2, the physical port and the TP protocol correspond to the classification items other than the selection items. A frame represented by the classification item other than the selection item, such as the physical port or the TP protocol, corresponds to a designated frame. In other words, all the UDP frames in the port P1 correspond to the designated frames. The condition generation unit 32 generates the condition item group 91 designating that all the UDP frames in the port P1 are to be discarded.

Specifically, based on the classification item group 81 of a classification number #1 shown in FIG. 2, the condition generation unit 32 overwrites the following condition item group 91 in the rule table 51 stored in the rule setting area 37 of the storage unit 35. In other words, in the condition item group 91, "discard" is designated in the "Act", the physical port P1 designated in the classification item group 81 is designated in the "physical port", and the UDP is designated in the "TP protocol". The remaining condition items are designated to be arbitrary, as indicated by the symbol "-" in the figure.

In the following S140, based on the description of the classification item group 81, the condition generation unit 32 generates the condition item group 91 indicating the filtering rule for passing the selection frame for the physical port designated by the classification item group 81. The selection frame is a frame represented by the description of the selection item among the designated frames.

For example, in the classification item group 81 of the classification number #1 shown in FIG. 2, at least the frame designated by the S-Port and the D-Port as the selection items in the designated frames corresponds to a selection frame. In other words, a frame in which all the UDP frames in the port P1 are set as designated frames, and a frame having the D-Port "1234" as a destination among the designated frames corresponds to the selection frame.

Specifically, based on the classification item group 81 of a classification number #1 shown in FIG. 2, the condition generation unit 32 overwrites the following condition item group 91 in the rule table 51 stored in the rule setting area 37 of the storage unit 35. In other words, in the condition item group 91, "transfer" is designated in the "Act", the port P1 designated in the classification item group 81 is designated in the "physical port", and the UDP is designated in the "TP protocol". The port number "1234" designated by the selection item is designated in the "D-Port", and the remaining condition items are designated to be optional as indicated by a symbol "-" in the drawing. Then, the condition generation unit 32 ends the condition generating process as described above.

In S150, the condition generation unit 32 generates the condition item group 91 indicating the filtering rule for discarding the designated frame for the physical port designated by the classification item group 81 based on the description of the classification item group 81.

For example, although not shown, in the classification item group 81 shown in FIG. 2, if the physical port is designated as P1 and the TP protocol is designated as TCP, all the TCP frames in the port P1 correspond to the designated frames. The condition generation unit 32 generates the condition item group 91 designating that all the TCP frames in the port P1 are to be discarded, and overwrites the condition item group 91 with the rule table 51.

In the following S160, the condition generation unit 32 generates the condition item group 91 indicating the filtering rule for passing the selection frame for the physical port designated by the classification item group 81 based on the description of the classification item group 81.

For example, although not shown, if the D-Port is designated as "1234" in the classification item group 81 shown in FIG. 2, all the TCP frames in the port P1 are set as designated frames, and a frame whose D-Port is "1234" among the designated frames corresponds to the selection frame. The condition generation unit 32 generates the condition item group 91 designating that the selection frame is to be transferred, and overwrites the condition item group 91 with the rule table 51. Then, the condition generation unit 32 ends the condition generating process as described above.

1-3. Operation

The operation when the condition generation unit 32 configured as described above generates the condition item group 91 as the filtering rule based on the classification item group 81 of the classification number #1 shown in FIG. 2 will be described.

In the classification item group 81 of the classification number #1, the physical port for which the condition item group 91 is generated is P1. The TP protocol is UDP. All UDP frames in the port P1 correspond to designated frames. The "D-Port" corresponds to the selection item. Among the designated frames, a frame whose "D-Port" is "1234" corresponds to the selection frame.

The condition generation unit 32 generates two condition item groups 91, such as the rule number No. 1 and the rule number No. 2, as shown in the condition item group 91 of FIG. 3, by the condition generating process based on one classification item group 81 of the classification number #1. In other words, a condition item group indicating that the designated frame is discarded is generated as the condition item group 91 of the rule number No. 1, and a condition item group indicating that only the selection frame is transferred is generated as the condition item group 91 of the rule number No. 2.

In this manner, the condition generation unit 32 is configured to set the rule number for the condition item group 91 indicating that only the selection frame is transferred to be larger than the rule number for the condition item group 91 indicating that the designated frame is discarded.

1-4. Effects

According to the first embodiment described in detail above, the following effects are obtained.

(1a) The network switch 12 is configured to relay the frame between the multiple communication lines 5A to 5D. In S130 to S160, the condition generation unit 32 is configured to generate the condition item group 91 representing the filtering rule for the frame based on the classification item group 81. The condition item group 91 has the multiple condition items. The filter unit 33 is configured to perform processing on the received frame based on the filtering rule represented by the condition item group 91.

In this example, the number of classification items in the classification item group 81 is smaller than the number of condition items in the condition item group 91. For example, if the network switch 12 is configured to acquire the classification item group 81 from the microcomputer 11, the communication capacity with the microcomputer 11 is inhibited as compared with the case where the condition item group 91 representing the filtering rule is acquired from the microcomputer 11.

As a result, the set time of the filtering rule for the network switch 12 can be reduced.

(1b) In S100, the condition generation unit 32 may be configured to directly or indirectly acquire the classification item group 81 (for example, through the classification storage unit 31 or the storage unit 35) from the microcomputer 11, which is an external device of the network switch 12. The external device refers to a device provided outside the network switch 12. In general, a communication speed with the external device is lower than a communication speed at which data is read from or written to the storage unit 35 inside the network switch 12, for example. As a result, the communication capacity with the external device is inhibited as compared with the case where the condition item group 91 is acquired from the external device (that is, the microcomputer 11) so that the set time of the filtering rule with respect to the network switch 12 can be shortened.

(1c) The classification storage unit 31 is configured to store the simple table 41 including the classification item group 81 in the storage unit 35. The condition generation unit 32 is configured to generate the condition item group 91 based on the classification item group 81 of the simple table 41 stored in the storage unit 35. As a result, the classification item group 81 can be acquired from the storage unit 35 at an arbitrary timing, and the condition item group 91 can be generated based on the classification item group 81. In S100, the condition generation unit 32 may be configured to store the classification item group 81 acquired from the microcomputer 11 in the simple setting area 36 of the storage unit 35. In this case, the classification storage unit 31 can be omitted.

(1d) The condition generation unit 32 may be configured to store the condition item group 91 in the rule setting area 37 of the storage unit 35. As a result, filtering can be repeatedly performed at arbitrary timing based on the condition item group 91.

(1e) The condition generation unit 32 may be configured to acquire the classification item group 81 in which at least one classification item is a part of the multiple condition items in the condition item group 91. Since the classification item is a part of the condition item group representing the filtering rule, the condition item group 91 representing the filtering rule can be easily generated by overwriting or the like based on the classification item group.

(1f) The classification item group may include at least one selection item as the classification item. The condition generation unit 32 may be configured to generate a pass item group and a discard item group based on the selection item. The pass item group refers to the condition item group 91 representing a filtering rule for passing the selection frame. The discard item group refers to the condition item group 91 representing the filtering rule for discarding a designated frame. For example, in FIG. 3, the condition item group 91 of the rule number No. 1 corresponds to the discard item group, and the condition item group 91 of the rule number No. 2 corresponds to the pass item group. As a result, since the multiple condition item groups 91 can be generated based on one classification item group, the set time of the filtering rule can be shortened. In other words, in the microcomputer 11 and the network switch 12 whose communication speed is lower than a communication speed inside the network switch 12, the microcomputer 11 transmits the classification item group smaller than the condition item group 91 (smaller communication capacity) to the network switch 12, so that a communication waiting can be inhibited and the set time of the filtering rule can be shortened.

(1g) The classification item group may include, as a selection item, a classification item in which any one of the UDP port number and the TCP port number is described. If the UDP port number is included, the UDP port number is at least one of the D-Port and the S-Port. When the TCP port number is included, the TCP port number is at least one of the D-Port and the S-Port. As a result, the filtering rule based on the port number can be generated.

(1h) The condition generation unit 32 may be configured to generate one pass item group and one discard item group based on the selection item. The filtering rule generally defines a rule for determining whether or not to pass data. As a result, the two condition item groups 91 such as passing and discarding can be set based on the simple setting of designating the selection frame in the classification item group 81.

1-5. Modifications

The classification item group may include, as the selection item, a classification item in which at least one of the MAC address and the IP address is described. If the MAC address is included as the selection item, the MAC address may be at least one of the D-MAC and the S-MAC. If the IP address is included as the selection item, the IP address may be at least one of the D-IP and the S-IP.

Figure 6:
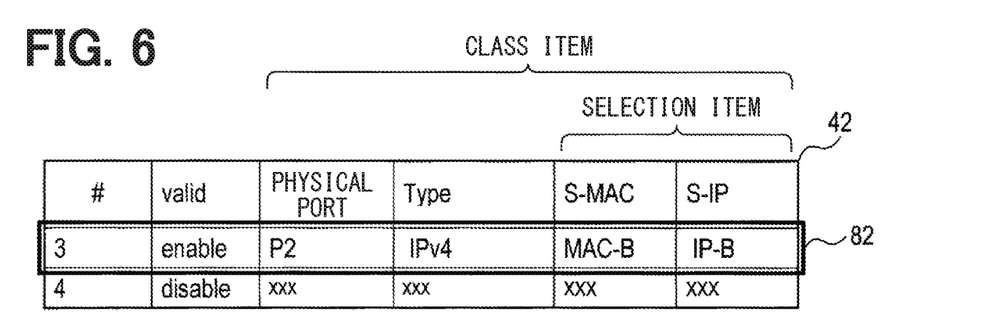
FIG. 6 is an illustrative diagram showing an example of a simple table according to a modification.

For example, in the simple table 42 shown in FIG. 6, the classification item group 82 may include the S-Mac and the S-IP as the selection items. The classification item group 82 may include the physical port and the Type as the classification items other than the selection items. Either the IPv4 or the IPv6 is designated as the Type.

In the classification item group 82 of the classification number #3 in FIG. 6, all the IPv4 frames in the port P2 correspond to the designated frames. Also, among the designated frames, a frame designated by the MAC-B whose S-MAC is the MAC address of the second other ECU 30B and designated by the IP-B whose S-IP is the IP address of the second other ECU 30B corresponds to the selection frame.

The condition generation unit 32 may be configured to generate a discard item group for discarding the designated frame described above, as represented by the rule number No. 3 in FIG. 3, based on the classification item group 82 of the classification number #3 by the condition generating process. In addition, the condition generation unit 32 may be configured to generate a pass item group for transferring the selection frame, as represented by the rule number No. 4 in FIG. 3, based on the classification item group 82 of the classification number #3 by the condition generating process.

Figure 4:
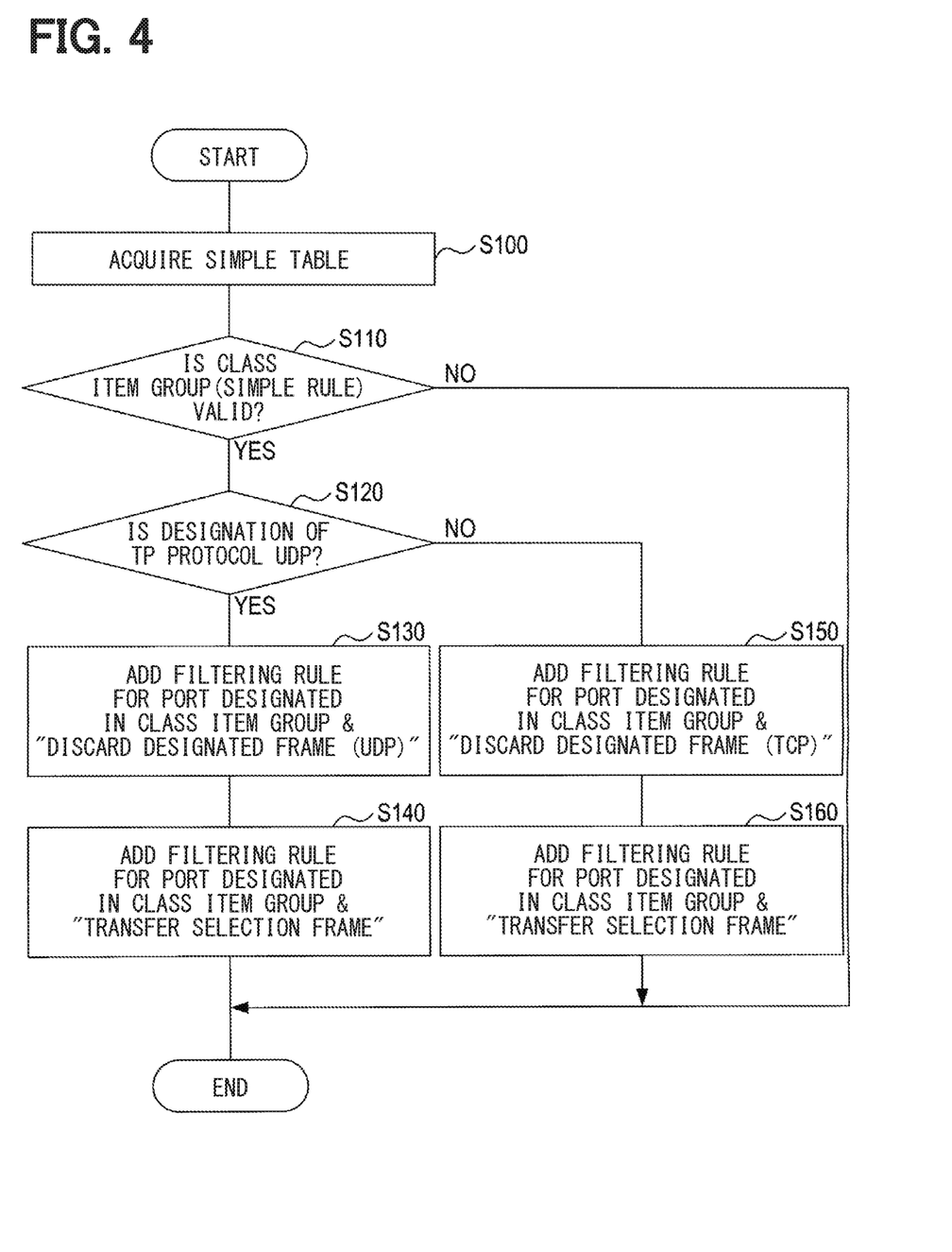
FIG. 4 is a flowchart of a condition generating process according to the first embodiment.
Figure 5:
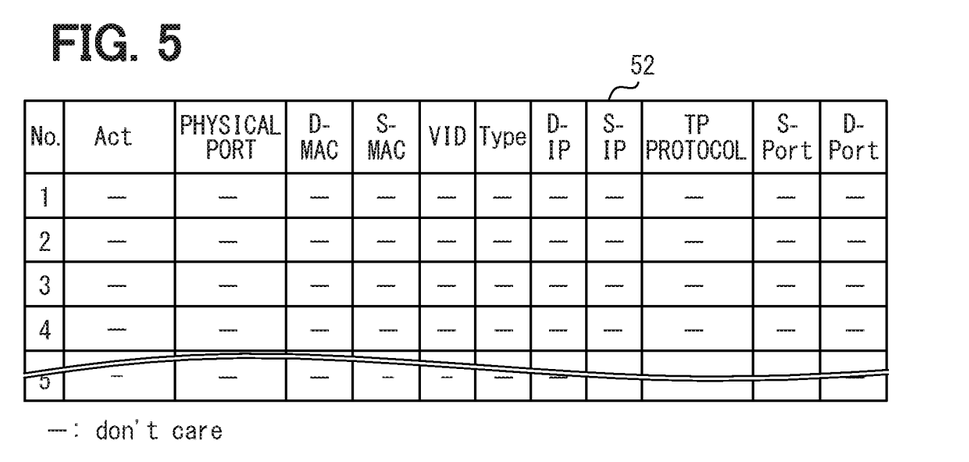
FIG. 5 is an illustrative diagram illustrating an initial state of the rule table.

In this instance, for example, in S120 in FIG. 4, it may be determined whether or not the Type designation is IPv4. Then, in S130 and S140 where the determination is affirmative in S120 and the transition is made, the process may be performed with the IPv4 frame at the designated port as the designated frame in the classification item group 82. Further, in S150 and S160 where a negative determination is made in S120 and a transition is made, the process may be performed with the IPv6 frame at the designated ports as the designated frame in the classification item groups 82.

2. Second Embodiment

2-1. Configuration

Since a basic configuration of a second embodiment is the same as that of the first embodiment, differences will be described below. The same reference numerals as in the first embodiment denote the same components, and reference is made to the preceding description.

In the first embodiment described above, an example in which two condition item groups are generated from one classification item group has been described. On the other hand, the second embodiment differs from the first embodiment in that three condition item groups are generated from one classification item group.

Figure 7:
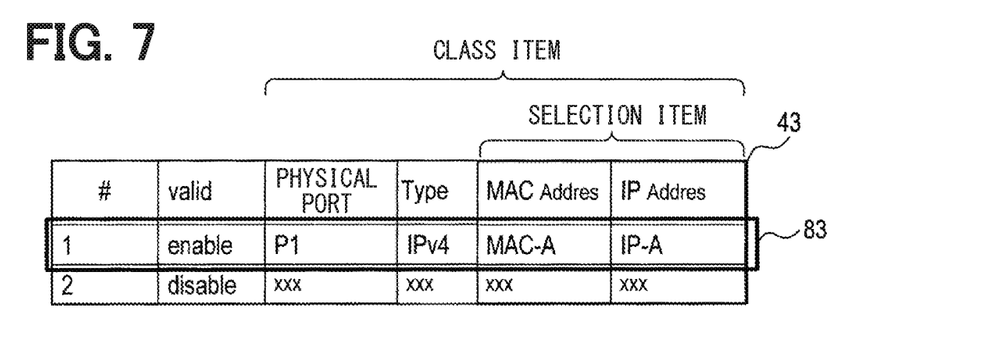
FIG. 7 is an illustrative diagram showing an example of a simple table according to a second embodiment.

In the present embodiment, as shown in FIG. 7, the classification item group 83 including the physical port, the Type, the MAC address, and the IP address as classification items is described in the simple table 43. In the classification item group 83, the MAC address and the IP address correspond to the selection items. The selection item referred to in the present specification represents both the source of the frame and the destination of the frame. The physical port and the Type correspond to classification items other than the selection items.

Specifically, in FIG. 7, in the classification item group 83 of the classification number #1, P1 is designated for the physical port, and IPv4 is designated for the Type. Further, in the classification item group 83 of the classification number #1, the MAC address, which is the MAC address of the first other ECU 30A, is designated to be MAC-A, and the IP-A, which is the IP address of the first other ECU 30A, is designated to be IP-A.

Figure 8:
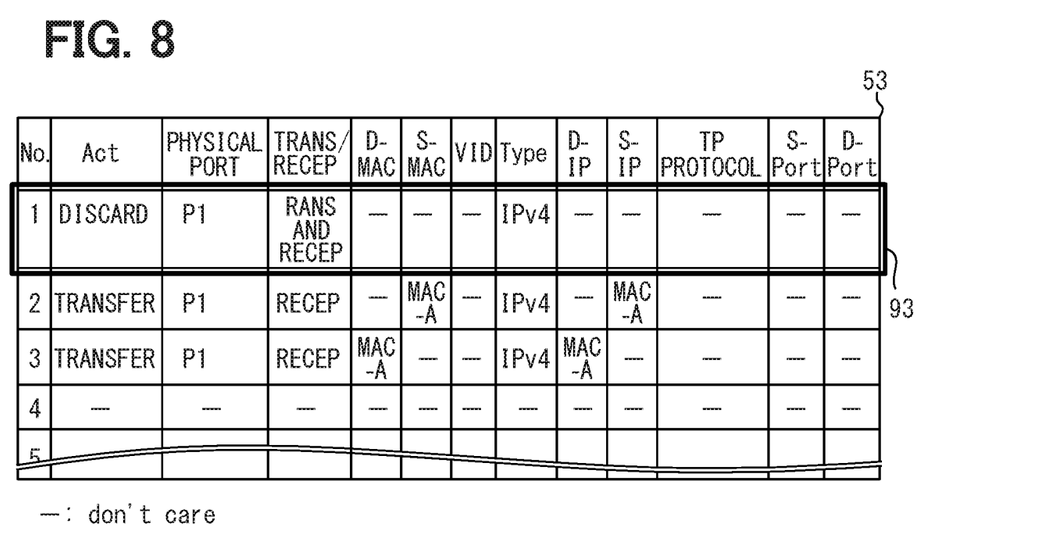
FIG. 8 is an illustrative diagram showing an example of a rule table according to the second embodiment.

In the present embodiment, the condition item group 93 in the rule table 53 shown in FIG. 8, the transmission/reception information added as a condition item to the condition item group 91 in the rule table 51 shown in FIG. 3. The transmission/reception information is described in the "transmission/reception" column in FIG. 8. The transmission/reception information is information indicating whether the filtering rule represented by the classification item group 83 is applied at the time of transmission, at the time of reception, or at both the time of transmission and at the time of reception (hereinafter referred to as transmission/reception).

2-2. Processing

Figure 9:
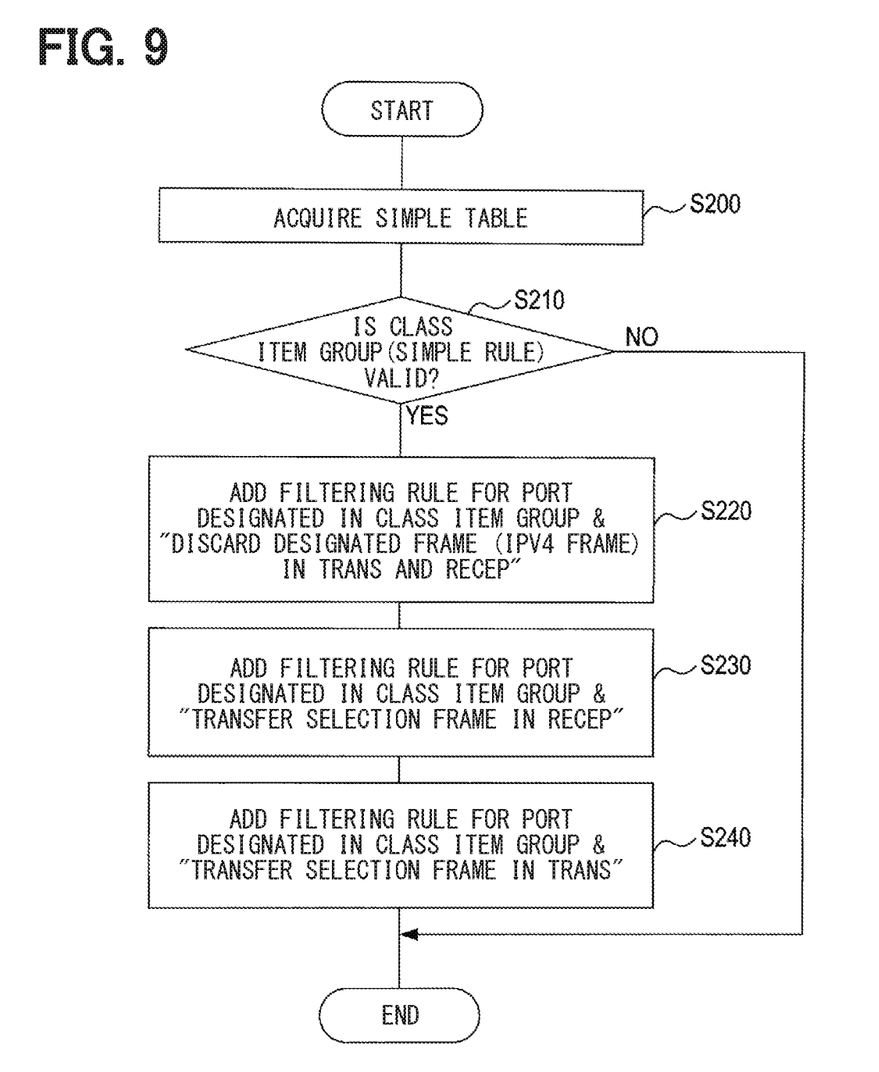
FIG. 9 is a flowchart of condition processing according to the second embodiment.

Next, the term processing to be executed by the condition generation unit 32 in the network switch 12 of the second embodiment in place of FIG. 4 of the first embodiment will be described with reference to a flowchart of FIG. 9. Since the processing in S200 to S210 in FIG. 9 is the same as the processing in S100 to S110 in FIG. 4, a description of the processing will be partially simplified.

In S220, based on the description of the classification item group 83, the condition generation unit 32 generates the condition item group 93 indicating the filtering rule for discarding the designated frame in the transmission and reception of the frame for the physical ports designated by the classification item group 83. For example, in the classification item group 83 of the classification number #1 shown in FIG. 7, all the IPv4 frames at the port P1 correspond to the designated frames in the transmission and reception of the frames.

Specifically, the condition generation unit 32 overwrites the following condition item group 93 in the rule table 53 stored in the rule setting area 37 of the storage unit 35. In other words, in the condition item group 93, "discard" is designated in the "Act", the port P1 designated in the classification item group 83 is designated in the "physical port", and transmission and reception are designated in "transmission/reception". IPv4 is designated in the "Type". The remaining condition items are designated to be arbitrary, as indicated by the symbol "-" in the figure. As a result, the condition item group 93 of the rule No. 1 shown in FIG. 8 is generated and stored in the storage unit 35.

In S230, the condition generation unit 32 generates the condition item group 93 indicating the filtering rules for passing the selection frame in the reception for the physical port designated by the classification item group 83 based on the description of the classification item group 83.

For example, in the classification item group 83 of the classification number #1 shown in FIG. 7, a frame in which the D-MAC as the selection item is designated as the MAC-A and the D-IP as the selection item is designated as the MAC-A in the reception among the designated frames corresponds to the selection frame. In other words, all the IPv4 UDP frames in the port P1 are set as designated frames, and a frame in which the D-MAC and the D-IP designate the first other ECU 30A in the designated frame corresponds to the selection frame.

Specifically, the condition generation unit 32 overwrites the following condition item group 93 in the rule table 53 stored in the rule setting area 37 of the storage unit 35. In other words, in the condition item group 93, the "transfer" is designated in the "Act", the port P1 designated in the classification item group 83 is designated in the "physical port", and the reception is designated in the "transmission/reception". IPv4 is designated in the "Type". The remaining condition items are designated to be arbitrary, as indicated by the symbol "-" in the figure. As a result, the condition item group 93 of the rule No. 2 shown in FIG. 8 is generated and stored in the storage unit 35.

In S240, the condition generation unit 32 generates the condition item group 93 indicating the filtering rules for passing the selection frame in the transmission for the physical port designated by the classification item group 83 based on the description of the classification item group 83.

For example, in the classification item group 83 of the classification number #1 shown in FIG. 7, a frame in which the S-MAC as the selection item is designated as the MAC-A and the S-IP as the selection item is designated as the MAC-A among the designated frames corresponds to the selection frame. In other words, all the IPv4 UDP frames in the port P1 are set as designated frames, and a frame in which the S-MAC and the S-IP designate the first other ECU 30A among the designated frames corresponds to the selection frame.

Specifically, the condition generation unit 32 overwrites the condition item group 93 in the rule table 53 stored in the rule setting area 37 of the storage unit 35, similarly to S230. However, in this step, the transmission is designated as the "transmission/reception". As a result, the condition item group 93 of the rule No. 3 shown in FIG. 8 is generated and stored in the storage unit 35. The condition generation unit 32 ends the condition processing as described above.

In this manner, the condition item group 93 of the rule number No. 1 to the rule number No. 3 shown in FIG. 8 is generated based on the classification item group 83 of the classification number #1 shown in FIG. 7. The condition item group 93 of the rule number No. 1 shown in FIG. 8 corresponds to the discard item group, and the condition item group 93 of the rule number Nos. 2 to 3 shown in FIG. 8 corresponds to the pass item group.

2-3. Effects

According to the second embodiment described in detail above, the effects (1a) to (1f) of the first embodiment described above are obtained, and the following effects are obtained.

(2a) The classification item group 83 includes, as the selection item, a classification item in which at least one of the MAC address and the IP address is described. As a result, filtering based on at least one of the MAC address and the IP address can be performed.

(2b) The condition generation unit 32 is configured to generate two pass item groups and one discard item group based on the selection item. In other words, three condition item groups 93 can be generated based on one classification item group 83. As a result, the same effects as in (1a) can be obtained.

3. Other Embodiments

Although the embodiments of the present disclosure have been described above, the present disclosure is not limited to the embodiments described above, and various modifications can be made to implement the present disclosure.

(3a) The condition generation unit 32 may be configured to generate two condition item groups from one classification item group as in the condition processing of the first embodiment, or to generate three condition item groups from one classification item group as in the condition processing of the second embodiment, in accordance with the classification item of the classification item group of the simple table.

In this case, for example, the simple setting area 36 may include a first setting area and a second setting area, the simple table 41 described above may be stored in the first setting area, and the simple table 43 described above may be stored in the second setting area. When the simple table is acquired from the first setting area, the condition generation unit 32 may be configured to generate a condition item group according to the flowchart shown in FIG. 4. The condition generation unit 32 may be configured to generate the condition item group according to the flowchart shown in FIG. 9 when the simple table is acquired from the second setting area.

(3b) The condition generation unit 32 may be configured to generate one condition item group from one classification item group.

(3c) The network switch 12 may be configured to generate the rule table by the condition generation unit 32 when the simple table is transmitted from the microcomputer 11. In other words, in FIG. 1, the network switch 12 may be configured to omit the classification storage unit 31.

(3d) In the classification item group, TCP may be described in the TP protocols. In the classification item group, only the MAC address may be included as the classification item. In the classification item group, only the IP address may be included as the classification item.

(3e) The classification item in the classification item group may include a port number in the UDP (hereinafter referred to as UDP port number) or a port number in the TCP (hereinafter referred to as TCP port number) as the selection item. In other words, the selection item referred to in the present specification represents both the source of the frame and the destination of the frame. The condition generation unit 32 may be configured to generate three condition item groups, such as one discard item group at the time of transmission and receive, a pass item group at the time of reception, and a pass item group at the time of transmission, based on the classification item group, as in the second embodiment.

(3f) At least one of the S-MAC and the S-IP, or at least one of the D-MAC and the D-IP may be included as the selection item in the classification item group. In other words, the selection item referred to in the present specification may represent either the source of the frame or the destination of the frame. Similar to the first embodiment, the condition generation unit 32 may be configured to generate two condition item groups such as one discard item group and one pass item group from one classification item group.

(3g) The multiple functions of one component in the above embodiment may be realized by multiple components, or a function of one component may be realized by the multiple components. In addition, multiple functions of multiple components may be realized by one component, or a single function realized by multiple components may be realized by one component. In addition, a part of the configuration of the above embodiment may be omitted. At least a part of the configuration of the above embodiment may be added to or substituted for the configuration of the other above embodiment.

(3h) In addition to the ECU 10 and the network switch 12 described above, the present disclosure can be implemented in various forms such as a frame relay method.

The network switch 12 corresponds to a relay device, the condition generation unit 32 corresponds to a classification acquisition unit, and the filter unit 33 corresponds to an execution unit. Further, S100 corresponds to processing as the classification acquisition unit, and S130 to S160 and S220 to S240 correspond to processing as the condition generation unit.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A relay device configured to relay a frame between a plurality of communication lines, the relay device comprising:
   a memory and processor coupled to the memory, the processor executing instructions which, when executed, cause the relay device to:
   acquire at least one classification item group which has a plurality of classification items and represents a classification condition for classifying a received frame to perform a predetermined process, wherein there is a numerical number of the classification items;
   generate at least one condition item group which has a plurality of condition items and represents a filtering rule for the frame based on the classification item group, wherein there is a numerical number of the condition items in the condition item group; and
   perform the process on the received frame based on the filtering rule represented by the condition item group, wherein:
   the processor is configured to acquire the classification item group in which the numerical number of the classification items is less than the numerical number of the condition items in the condition item group.

2. The relay device according to claim 1, wherein:
the processor is further configured to acquire the classification item group in which at least one of the classification items is a part of the plurality of condition items in the condition item group.

3. The relay device according to claim 2, wherein:
the classification item group includes at least one selection item representing at least one of a transmission source of the frame and a transmission destination of the frame as one of the classification items; and
the processor is further configured to generate, based on the selection item, a discard item group as one of a plurality of condition item groups representing the filtering rule that discards a designated frame represented by one of the classification items other than the selection item, and a pass item group as at least one of the condition item groups representing the filtering rule that passes at least a selection frame represented by a description of the selection item.

4. The relay device according to claim 3, wherein:
the classification item group includes one of the classification items describing one of an UDP port number and a TCP port number as the selection item.

5. The relay device according to claim 3, wherein:
the classification item group includes one of the classification items describing at least one of a MAC address and an IP address as the selection item.

6. The relay device according to claim 3, wherein:
the processor is further configured to generate one pass item group and one discard item group based on the selection item.

7. The relay device according to claim 3, wherein:
the processor is further configured to generate a plurality of pass item groups and one discard item group based on the selection item.

8. The relay device according to claim 1, which is connected to an external device, wherein:
the processor is further configured to acquire the classification item group from an external device.

* * * * *